United States Patent [19]

Schuurman et al.

[11] Patent Number: 5,783,061
[45] Date of Patent: Jul. 21, 1998

[54] METHOD OF REMOVING IRON COMPOUNDS AND CHROMIUM COMPOUNDS FROM AN AQUEOUS ELECTROLYTIC SOLUTION AS WELL AS THE USE OF THIS METHOD IN ELECTROCHEMICAL MACHINING

[75] Inventors: Arend Schuurman; Johan Faber, both of Drachten, Netherlands

[73] Assignee: U.S. Philips Corporation, New York, N.Y.

[21] Appl. No.: 813,143

[22] Filed: Mar. 7, 1997

[30] Foreign Application Priority Data

Mar. 27, 1996 [EP] European Pat. Off. ............. 96200831

[51] Int. Cl.$^6$ .................................................. C25F 7/02
[52] U.S. Cl. ................... 205/673; 205/101; 210/702; 210/720; 210/724
[58] Field of Search .................... 205/99, 101, 673, 205/DIG. 13; 210/702, 720, 724

[56] References Cited

U.S. PATENT DOCUMENTS

| 3,896,209 | 7/1975 | Fournier et al. | 423/55 |
|---|---|---|---|
| 4,040,920 | 8/1977 | Takada et al. | 204/129 |
| 4,321,149 | 3/1982 | Hawxhurst et al. | 210/720 |
| 4,746,413 | 5/1988 | Pott et al. | 205/673 |
| 5,380,441 | 1/1995 | Thornton | 210/710 |

*Primary Examiner*—Kathryn L. Gorgos
*Assistant Examiner*—William T. Leader
*Attorney, Agent, or Firm*—Ernestine C. Bartlett; Norman N. Spain

[57] ABSTRACT

The invention relates to a method of removing iron compounds and chromium compounds from an aqueous electrolytic solution. Said method is characterized by the following succession of steps:

a) adding hydrogen peroxide to the solution and, if necessary, adapting the acidity of the solution so that the pH value of the solution is $\geq 7$;

b) separating the iron hydroxide formed;

c) adapting the acidity of the solution so that the pH value of the solution is <4;

d) adapting the acidity of the solution so that the pH value of the solution is $\geq 7$;

e) separating the chromium hydroxide formed.

The above-described method provides a simple manner of selectively removing chromium compounds and iron compounds from an aqueous electrolytic solution which preferably contains sodium nitrate. The necessary redox reactions take place via oxidation and reduction of C ions by means of hydrogen peroxide. The pH value is preferably adapted by means of sodium hydroxide and nitric acid, so that no ions which are foreign to the process are added to the solution. The inventive process enables such a solution to be regenerated.

6 Claims, 1 Drawing Sheet

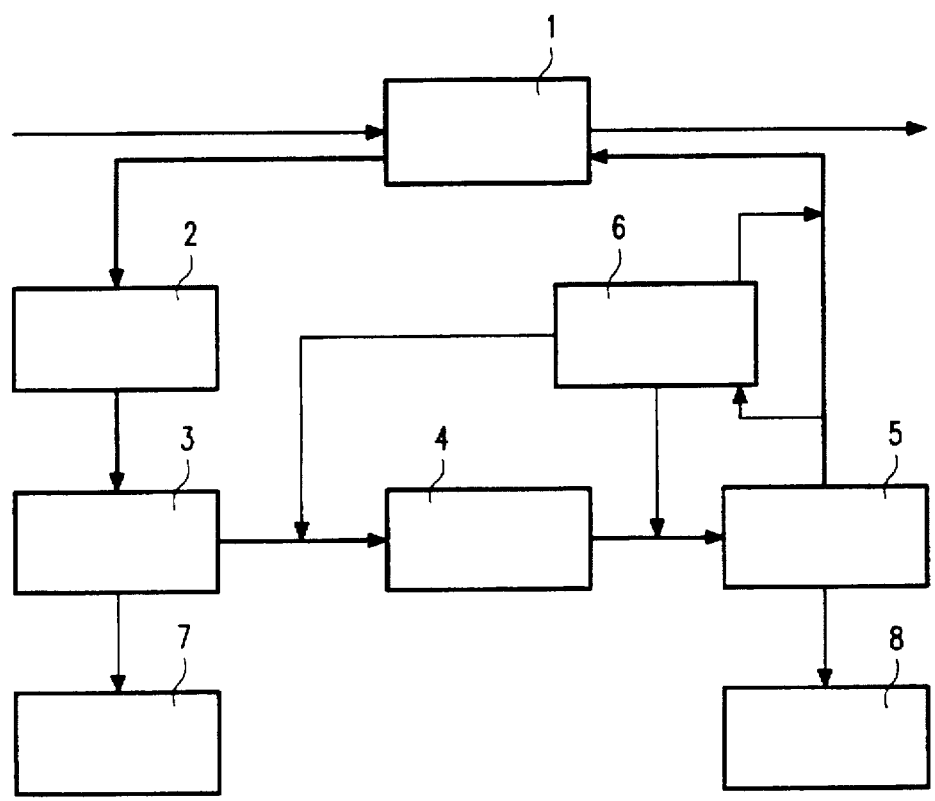

METHOD OF REMOVING IRON COMPOUNDS AND CHROMIUM COMPOUNDS FROM AN AQUEOUS ELECTROLYTIC SOLUTION AS WELL AS THE USE OF THIS METHOD IN ELECTROCHEMICAL MACHINING

FIELD OF THE INVENTION

The invention relates to a method of removing iron compounds and chromium compounds from an aqueous electrolytic solution. The invention also relates to the use of this method in reprocessing the electrolytic solution used in the electrochemical machining of chromium-steel objects.

BACKGROUND OF THE INVENTION

The above-mentioned aqueous electrolytic solution containing chromium compounds and iron compounds may be formed, for example, during the so-called electrochemical machining (ECM) of chromium-steel objects. In this technique, chromium-steel objects are placed in a highly ionic solution which, for this purpose, preferably contains a considerable quantity of sodium nitrate. During machining, the object to be machined serves as the anode and the electrode of the ECM apparatus serves as the cathode. During the machining process, an electric current is passed between the anode and the cathode. Under these conditions, the electrode serves as a shaping tool. The object which serves as the anode dissolves locally, thereby forming metal ions, for example, in the form of metal hydroxide(s), while hydrogen is developed at the surface of the electrode. This machining method enables (patterns of) randomly shaped holes to be formed in the chromium-steel object in a relatively simple and accurate manner.

During the electrochemical machining of chromium-steel objects, a considerable quantity of Fe(III) ions, Cr(III) ions and Cr(VI) ions are formed in the aqueous electrolytic solution. The presence of these ions as well as of precipitates of hydroxy salts of these ions in the highly ionic solution adversely affect the effectiveness of the ECM process. Consequently, the solution has to be replaced or regenerated regularly.

In particular Cr(VI) ions of the solution used form a strong oxidation agent and are very toxic. The toxicity of Cr(VI) is approximately 100 times that of Cr(III). Dependent upon the pH of the solution, Cr(VI) is found as a chromate, hydrogen chromate, dichromate or polychromate. Also because of this toxicity, efforts are made to selectively separate these ions from the electrolytic solution used.

A method of the type mentioned in the opening paragraph is well known. For example, in United States Patent document U.S. Pat. No. 4,040,920, a description is given of how chromium compounds and iron compounds can be removed from an electrolytic solution containing both Cr(VI) ions and Fe(III) ions. To this end, this solution is mixed with an aqueous solution containing an Fe(II) compound, whereafter the pH of the mixture is brought to a value ranging from 8 to 8.5. Under these conditions, Fe(II) is oxidized to Fe(III) and Cr(VI) is reduced to Cr(III). The relatively high pH value causes the trivalent ions formed to precipitate simultaneously as $Fe(OH)_3$ and $Cr(OH)_3$.

The known method has a number of important drawbacks. One of these drawbacks is that the precipitate formed contains both iron hydroxide and chromium hydroxide. This is very undesirable in view of the aim to collect these hydroxides separately. The cost of separating this precipitate at a later stage is unacceptably high. A further drawback of the known method is that the overall quantity of metal hydroxides is increased because a considerable quantity of Fe(II) compound is added to the solution to be treated. This too is very undesirable.

SUMMARY OF THE INVENTION

Therefore, it is an object of the invention to obviate the above disadvantages. The invention more particularly aims at a method in which iron- and chromium-containing compounds are formed which can be separately removed from the aqueous solution. In this respect, the overall quantity of compounds to be separated should be as small as possible. The invention particularly aims at a method in which the aqueous electrolytic solution is purified in such a way that it can be re-used. It should also be possible to combine the inventive method with the electrochemical machining of chromium-steel objects in a simple and inexpensive manner.

These and other objects are achieved by a method of removing iron compounds and chromium compounds from an aqueous electrolytic solution, which method comprises the following steps according to the invention:

a) adding hydrogen peroxide to the solution and, if necessary, adjusting the acidity of the solution so that the pH value of the solution is $\geq 7$;

b) separating the iron hydroxide formed;

c) adjusting the acidity of the solution so that the pH value of the solution is $<4$;

d) adjusting the acidity of the solution so that the pH value of the solution is $\geq 7$;

e) separating the chromium hydroxide formed.

The method in accordance with the invention is based on the surprising finding that, dependent upon the pH-value of the aqueous solution, the hydrogen peroxide present in said solution can react with Cr ions in two ways. In the case of a low acidity (pH$\geq$7) hydrogen peroxide may cause the Cr(III) present to oxidize to Cr(VI), whereas in the case of a high acidity (pH<4) hydrogen peroxide may reduce the Cr(VI) present to Cr(III).

This finding can be used to great advantage in an aqueous electrolytic solution which contains both Fe(III) ions, Cr(II) ions and Cr(VI) ions. The addition of an ample excess of hydrogen peroxide causes all Cr(III) to be converted in an alkaline medium (pH>7) to soluble chromate ($CrO_4^{2-}$). Under these conditions, the Fe(III) present is deposited as iron hydroxide. The precipitate thus formed is subsequently separated from the solution, for example by centrifuging or by filtering off, the latter process being the simplest one of the two. As the chromium already present is contained in the solution in the form of a readily soluble chromate, the separated iron hydroxide is substantially free of chromium compounds. As a result, the separated iron hydroxide is very pure. In addition, the quantity of separated iron hydroxide is much smaller than in the known method in which the addition of an extra quantity of Fe(II) compound is necessary.

After the separation of iron hydroxide, the aqueous electrolytic solution comprises mainly electrolyte (for example, sodium nitrate) and chromate. Subsequently, the solution is acidified to a pH-value below 4. Under these conditions, substantially all of the Cr(VI) present is reduced to Cr(III) under the influence of a small hydrogen-peroxide deficiency, which Cr(III) is available in the solution as a soluble salt. After the subsequent reduction of the acidity of the solution (pH$\geq$7), this Cr(III) precipitates as chromium hydroxide. This is also separated from the aqueous electrolytic solution, for example by centrifuging. However, filtering off the chromium hydroxide proved to be simpler.

The precipitate of chromium hydroxide obtained appears to be substantially free of iron hydroxide. Any enclosed sodium nitrate is removed from the precipitate in a simple manner by washing with water. The remaining aqueous electrolytic solution is substantially free of Fe ions and Cr ions. This solution predominantly comprises only the original electrolyte as well as ions of the compounds which have been added to adjust the degree of acidity. In the method in accordance with the invention, the originally present Fe ions and Cr ions are separately separated from the aqueous electrolytic solution.

A preferred embodiment of the invention is characterized in that the acidity of the solution in step c) is adapted in such a manner that the solution obtains a pH<2. If the pH value of the solution is smaller than 2, then substantially all of the Cr(VI) of the solution is present as a dichromate ($Cr_2O_7^{2-}$). The presence thereof in the solution can readily be checked spectrophotometrically. This makes it possible to check whether all Cr(VI) has been converted to the desirable Cr(III). In the case of a small residue of dichromate, the quantity thereof can be determined spectrophotometrically, whereafter the necessary quantity of hydrogen peroxide can be added to the solution to reduce this residue to Cr(III). In this manner, the quantity of the toxic Cr(VI) in the solution can thus be minimized, i.e. to several tenths of one ppm.

Another preferred embodiment of the method in accordance with the invention is characterized in that sodium nitrate is used as the electrolyte, the adaptation of the acidity in steps a) and d) takes place by means of sodium hydroxide, and the adaptation of the acidity in step c) takes place by means of nitric acid. This measure provides the method with the important advantage that no ions which are foreign to the system are introduced into the solution. By virtue thereof, the electrolytic solution can be re-used, if necessary after adaptation of the sodium-nitrate concentration.

A further preferred embodiment of the method in accordance with the invention is characterized in that the electrolyte concentration in the aqueous solution is kept constant by means of electrodialysis. The use of electrodialysis during the implementation of the method in accordance with the invention has the important advantage that the aqueous electrolytic solution can be regenerated in a closed circuit. By virtue thereof, in particular this embodiment of the method in accordance with the invention, can very suitably be used to subject chromium-steel objects to electrochemical machining.

These and other aspects of the invention will be apparent from and elucidated with reference to the embodiments described hereinafter.

BRIEF DESCRIPTION OF THE DRAWING

FIG. 1 shows a flow chart of an embodiment of the method in accordance with the invention.

DETAILED DESCRIPTION OF THE PREFERRED EMBODIMENT

To carry out the method in accordance with the invention, use was made of an aqueous electrolytic solution containing iron compounds and chromium compounds. This solution was used to electrochemically machine chromium-steel objects. Such objects are made of an alloy which contains predominantly iron (approximately 87 at. %) and chromium (approximately 13 at. %). The relevant solution had a pH value of 7 and contained predominantly sodium nitrate (3 mol/l). The solution additionally contained trivalent iron in the form of Fe(III) hydroxide (34.1 mg/l), trivalent chromium in the form of Cr(III) hydroxide (0.8 mg/l) and hexavalent chromium in the form of chromate (5.7 mg/l).

Based upon the amount of Cr(III) present, an excess of hydrogen peroxide was added to the solution. Said excess of hydrogen peroxide promotes the reaction rate of the oxidation from C(III) to C(VI). The overall quantity of hydrogen peroxide to be added was determined by means of the overall quantity of Cr ions present in the solution as well as by the redox reactions to be brought about by said hydrogen peroxide. The quantity of Cr(III) ions should first be oxidized to Cr(VI) and then reduced to Cr(III). The quantity of Cr(VI) ions should be reduced to Cr(III) in a single step. If the overall quantity of both types of Cr ions is known, the quantity of hydrogen peroxide to be added to the solution can be calculated by means of simple redox equations.

The acidity of the solution was subsequently brought to pH=8 by means of a solution of sodium hydroxide (1 mol/l). Under these conditions, all of the chromium hydroxide present is converted to water-soluble chromate. At the same time, the iron hydroxide present precipitates. The precipitate was separated from the solution by means of "cross flow" microfiltration and subsequently washed with water to remove any sodium nitrate. Analysis of the precipitate showed that it consisted of substantially pure (>95 wt. %) iron hydroxide. The quantity of enclosed chromium hydroxide was less than 0.1 wt. %.

Subsequently, the filtrate was acidified by means of nitric acid ($HNO_3$; 1 mol/l) until the solution had a pH value <2. Under these conditions, the hydrogen peroxide present in the solution reduces all of the bichromate formed to Cr(III). By means of spectrophotometry it was determined whether the bichromate had indeed been converted. If a small residue of bichromate was still present in the solution, then the quantity thereof was determined. Subsequently, a corresponding quantity of hydrogen peroxide was added to the solution to convert this residue to the desired Cr(III).

After the reduction of all of the bichromate, the pH of the solution was brought to 7 by means of sodium hydroxide. Under these conditions, the Cr(III) formed precipitates as chromium hydroxide. The precipitate was separated from the solution by means of "cross flow" microfiltration and subsequently washed with water to remove any sodium nitrate. Analysis of the precipitate showed that it consisted of substantially pure (>95 wt. %) chromium hydroxide. The quantity of enclosed iron hydroxide was less than 1 wt. %.

Owing to the fact that nitric acid was used as the acid and sodium hydroxide as the base to adapt the acidity of the solution, the solution thus treated did not contain "foreign" ions but predominantly Na ions and $NO_3$ ions. By means of simple calculations it can be determined whether, and to which degree the solution must be diluted with pure water to obtain the original ion concentration. Consequently, the aqueous electrolytic solution can be used again after the Fe compounds and Cr compounds have been removed.

By means of the flow chart of FIG. 1, a description is given of how the method in accordance with the invention can be used to continuously regenerate, in a closed circuit, an aqueous electrolytic solution which is used to electrochemically machine chromium-steel objects. The numerals in the blocks indicate the following sub-processes:

1. subjecting an object to an electrochemical machining process
2. oxidizing Cr(III) to Cr(VI)
3. separating the iron hydroxide formed
4. reducing Cr(VI) to Cr(III)

5. separating the chromium hydroxide formed
6. subjecting a part of the solution to electrodialysis
7. washing the iron hydroxide separated
8. washing the chromium hydroxide separated.

In the flow chart, the thick arrows indicate the main stream of the circulation of the aqueous electrolytic solution in the closed circuit in accordance with the inventive process. The thin arrows refer to sub-streams from and to the main stream. With respect to the flow chart, the following remarks are made.

During the electrochemical machining of chromium-steel objects (block 1), iron compounds and chromium compounds are formed in the aqueous electrolytic solution used in this process. This solution is continuously circulated via a closed circuit and subjected to a number of process steps. First, hydrogen peroxide is added to the solution and, if necessary, the acidity is adapted (pH≧7). As a result, all of the Cr(III) present is converted to Cr(VI) and all of the Fe(III) present precipitates as iron hydroxide (block 2). Subsequently, this precipitate is separated, preferably by means of "cross flow" microfiltration (block 3). The iron hydroxide separated is washed with water to remove any sodium nitrate (block 7).

The filtrate of block 3, which is formed in said separating process, is subsequently acidified by nitric acid which is formed by electrodialysis (block 6) of a part of the main stream of the solution. As a result of this acidification process, the solution obtains an acidity of pH<4, as a result of which chromium reduction takes place, so that all of the Cr(VI) is converted to Cr(III) (block 4). If the acidity is adjusted to a pH value <2, initially only bichromate is formed. The conversion thereof to Cr(III) can be observed well by means of a spectrophotometer. If necessary, a small quantity of hydrogen peroxide is added, at this stage of the process to reduce substantially all of the bichromate. An optimum adjustment enables the residual concentration of Cr(VI) to be reduced to less than 0.1 ppm.

Subsequently, the solution is basified by means of sodium hydroxide, which has also been obtained via electrodialysis (block 6). As a result thereof, the solution obtains an acidity of pH≧7. Under these conditions, Cr(III) precipitates as chromium hydroxide which is subsequently separated (block 5). Said separation preferably takes place by means of "cross flow" microfiltration. The chromium hydroxide separated is washed with water to remove any sodium nitrate (block 8).

A part of the filtrate formed during separating of the chromium hydroxide is introduced into the electrodyalysis apparatus (block 6). As a result, the ingoing sodium nitrate containing filtrate is converted into an outgoing niteric acid stream and an outgoing sodium hydroxide stream. These outgoing streams are used to acidify or alkalize the main stream, as required, prior to introduction of the ingoing filtrate into the electrodyalysis apparatus. The filtrate treated in the electrodialysis apparatus has a lower sodium-nitrate concentration than the ingoing filtrate. This outgoing filtrate is led to the main stream. Under ideal conditions, the sodium-nitrate concentration in the regenerated solution (at the end of the cycle) is equal to that of the solution used (at the beginning of the cycle).

The above-described method provides a simple manner of selectively removing chromium compounds and iron compounds from an aqueous electrolytic solution which preferably contains sodium nitrate. The necessary redox reactions take place via oxidation and reduction of Cr ions by means of hydrogen peroxide. The pH value is preferably adapted by means of sodium hydroxide and nitric acid, so that no ions which are foreign to the process are added to the solution. The inventive process enables such a solution to be regenerated rapidly and efficiently.

We claim:

1. A method of removing iron compounds and chromium compounds from an aqueous electrolytic solution, said method comprising the succesive steps:

a) adding hydrogen peroxide to the solution and if the pH value of the resultant solution is not ≧7 adjusting the acidity of said solution so that its pH value is ≧7; thereby forming iron hydroxide;

b) separating the iron hydroxide from the solution;

c) adjusting the acidity of the solution so that the pH value of the solution is <4 to thereby convert Cr(VI) present in the solution to Cr III);

d) adjusting the acidity of the solution so that its pH value is ≧7 thereby forming chromium hydroxide; and separating the chromium hydroxide from the solution.

2. A method as claimed in claim 1, wherein the acidity of the solution in step c) is adjusted in such a manner that the solution obtains a pH<2.

3. A method as claimed in claim 2 wherein the solution comprises sodium nitrate as an electrolyte, the adjustment of the acidity in steps a) and d) takes place by adding sodium hydroxide to the solution and the adjustment of the acidity in step c) takes place by adding nitric acid to the solution.

4. The use of the method as claimed in claim 1 to reprocess an electrolytic solution used in the electrochemical machining of chromium-steel objects.

5. A method as claimed in claim 1 wherein the solution comprises sodium nitrate as an electrolyte, the adjustment of the acidity in steps a) and d) takes place by adding sodium hydroxide to the solution and the adjustment of the acidity in step c) takes place by adding nitric acid to the solution.

6. A method as claimed in claim 5 wherein the concentration of the sodium nitrate in the solution is kept constant by subjecting a portion of the solution, subsequent to separation of chromium hydroxide, to electrodialysis.

* * * * *